(12) United States Patent
Miyamoto

(10) Patent No.: US 12,044,935 B2
(45) Date of Patent: Jul. 23, 2024

(54) LIQUID CRYSTAL DISPLAY DEVICE

(71) Applicant: Japan Display Inc., Tokyo (JP)

(72) Inventor: Motoharu Miyamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/455,699

(22) Filed: Aug. 25, 2023

(65) Prior Publication Data

US 2023/0400737 A1 Dec. 14, 2023

Related U.S. Application Data

(63) Continuation of application No. 17/953,394, filed on Sep. 27, 2022, now Pat. No. 11,774,810, which is a continuation of application No. 17/408,590, filed on Aug. 23, 2021, now Pat. No. 11,500,252, which is a continuation of application No. 17/114,676, filed on Dec. 8, 2020, now Pat. No. 11,126,043, which is a continuation of application No. 16/555,806, filed on Aug. 29, 2019, now Pat. No. 10,890,812, which is a
(Continued)

(30) Foreign Application Priority Data

May 15, 2015 (JP) ................. 2015-099820

(51) Int. Cl.
*G02F 1/1343* (2006.01)
*G02F 1/1339* (2006.01)
*G02F 1/1362* (2006.01)

(52) U.S. Cl.
CPC ...... *G02F 1/134363* (2013.01); *G02F 1/1339* (2013.01); *G02F 1/13394* (2013.01); *G02F 1/136286* (2013.01); *G02F 1/134309* (2013.01); *G02F 1/134318* (2021.01)

(58) Field of Classification Search
CPC ......... G02F 1/136286; G02F 1/136227; G02F 1/1343–134372; H01L 27/124; H01L 27/1248

See application file for complete search history.

(56) References Cited

U.S. PATENT DOCUMENTS 7,961,282 B2 * 6/2011 Iwato ................ G02F 1/133711
349/123
9,638,949 B1 * 5/2017 Kim .................... G06F 3/04164
(Continued)

*Primary Examiner* — Mariceli Santiago
(74) *Attorney, Agent, or Firm* — Michael Best & Friedrich LLP

(57) ABSTRACT

The liquid crystal display device includes: a TFT substrate including scanning lines extending in a first direction and being arranged in a second direction, video signal lines extending in the second direction and being arranged in the first direction, pixel electrodes arranged in regions surrounded by the scanning lines and the video signal lines, and common electrodes formed with an insulating film arranged between the common electrodes and the pixel electrodes; a counter substrate opposed to the TFT substrate; and a liquid crystal. The first common electrode extends between the first and second scanning lines in the first direction, and the second common electrode extends between the second and third scanning lines in the first direction. The first and second common electrodes are electrically connected by a bridge. The bridge covers the first video signal line without covering the second video signal line, when seen in a plan view.

5 Claims, 13 Drawing Sheets

Related U.S. Application Data continuation of application No. 16/176,088, filed on Oct. 31, 2018, now Pat. No. 10,437,116, which is a continuation of application No. 15/698,760, filed on Sep. 8, 2017, now Pat. No. 10,162,232, which is a continuation of application No. 15/148,112, filed on May 6, 2016, now Pat. No. 9,785,022.

(56) References Cited

U.S. PATENT DOCUMENTS

| | | | | |
|---|---|---|---|---|
| 2005/0225708 | A1* | 10/2005 | Oke | G09G 3/3607 349/139 |
| 2006/0268211 | A1* | 11/2006 | Chen | G02F 1/134363 349/141 |
| 2008/0042955 | A1* | 2/2008 | Oke | G09G 3/3648 345/92 |
| 2010/0128210 | A1* | 5/2010 | Mori | G02F 1/136286 349/109 |
| 2011/0050551 | A1* | 3/2011 | Ota | G09G 3/3648 345/87 |
| 2014/0160066 | A1* | 6/2014 | Kim | G06F 3/0445 345/174 |
| 2015/0055043 | A1* | 2/2015 | Sakai | G02F 1/134363 349/42 |

* cited by examiner

LIQUID CRYSTAL DISPLAY DEVICE

CROSS-REFERENCE TO RELATED APPLICATIONS

This application is a continuation of U.S. patent application Ser. No. 17/953,394 filed on Sep. 27, 2022, which, in turn, is a continuation of U.S. patent application Ser. No. 17/408,590 (now U.S. Pat. No. 11,500,252) filed on Aug. 23, 2021, which, in turn, is a continuation of U.S. patent application Ser. No. 17/114,676 (now U.S. Pat. No. 11,126,043), filed on Dec. 8, 2020, which, in turn, is a continuation of U.S. patent application Ser. No. 16/555,806 (now U.S. Pat. No. 10,890,812), filed on Aug. 29, 2019, which, in turn, is a continuation of U.S. patent application Ser. No. 16/176,088 (now U.S. Pat. No. 10,437,116), filed on Oct. 31, 2018, which, in turn, is a continuation of U.S. patent application Ser. No. 15/698,760 (now U.S. Pat. No. 10,162,232), filed on Sep. 8, 2017, which, in turn, is a continuation of U.S. patent application Ser. No. 15/148,112 (now U.S. Pat. No. 9,785,022), filed on May 6, 2016. Further, this application claims priority from Japanese Patent Application Number 2015-99820 filed on May 15, 2015, the entire contents of which are hereby incorporated by reference into this application.

BACKGROUND OF THE INVENTION

(1) Field of the Invention

The present invention relates to a display device and, in particular, to a high-resolution liquid crystal display device.

(2) Description of the Related Art

In liquid crystal devices, a TFT substrate on which pixels each including a pixel electrode, and a thin film transistor (TFT), for example, are arranged in a matrix and a counter substrate are arranged to be opposed to each other. A liquid crystal is sandwiched between the TFT substrate and the counter substrate. A transmittance of light of liquid crystal molecules is controlled on a pixel-by-pixel basis, thereby an image is formed.

One of problems of the liquid crystal display devices is viewing angle characteristics. An IPS (In Plane Switching) liquid crystal display device rotates the liquid crystal molecules by an electric field parallel to the substrates to control the light transmittance of the liquid crystal, and is excellent in viewing angle characteristics. Meanwhile, the resolution of the liquid crystal display devices, in particular, small and medium-sized liquid crystal display devices is increasing.

With the increase of the resolution, a ratio of an area of a diameter of a through hole for allowing the pixel electrode to come in contact with a source electrode of the TFT, formed on the TFT substrate side, to an entire area of a pixel is also increased. Japanese Unexamined Patent Application Publication No. 2014-146039 describes a structure of the through hole in the IPS liquid crystal display device.

SUMMARY OF THE INVENTION

Liquid crystal display panels used for smartphones, tablets, and the like have been demanded to have a high resolution. These products have a horizontal pitch of 30 μm or less per pixel. Note that each of a red pixel, a green pixel, a blue pixel, and the like is referred to as a pixel in this specification, although a set of the red pixel, the green pixel, the blue pixel, and the like is referred to as a pixel in some cases.

Meanwhile, the IPS liquid crystal display devices are used in order to improve the viewing angle characteristics. In the IPS type, a structure is most commonly used in which a stripe or comb-teeth pixel electrode is arranged on a common electrode formed in a plane with an insulating film therebetween. In this IPS type, it is necessary to form the through hole in the insulating film that is thick in order to connect the TFT and the pixel electrode in each pixel. Therefore, the diameter of this through hole becomes large.

A potential that is common to the pixels has to be applied to the common electrode formed in a plane. As the pixel pitch is smaller, the ratio of the area occupied by the through hole to the entire area of the pixel is larger. Meanwhile, the common electrode has to be formed in a region other than the through hole, and therefore has a bridge shape between the horizontally adjacent through holes. Due to the existence of this bridge and the through hole, reduction of the pixel pitch is limited. Further, when the screen size is increased, the resistance of the common electrode becomes a problem. This is because the common electrode is formed of ITO (Indium Tin Oxide) that has a relatively large specific resistance.

The present invention has been made for providing a liquid crystal display device having a large screen that can achieve a pixel pitch corresponding to a high resolution while suppressing increase of a resistance of a common electrode.

(1) According to one aspect of the present invention, a liquid crystal display device includes: a TFT substrate including scanning lines extending in a first direction and being arranged in a second direction, video signal lines extending in the second direction and being arranged in the first direction, pixel electrodes arranged in regions surrounded by the scanning lines and the video signal lines, and common electrodes formed with an insulating film arranged between the common electrodes and the pixel electrodes; a counter substrate opposed to the TFT substrate; and a liquid crystal sandwiched between the TFT substrate and the counter substrate. A first common electrode extends between a first scanning line and a second scanning line in the first direction, a second common electrode extends between the second scanning line and a third scanning line in the first direction, and the first common electrode and the second common electrode are electrically connected by a bridge. The bridge covers a first video signal line without covering a second video signal line, when seen in a plan view.

(2) In the liquid crystal display device described in (1), the bridge is formed by a metal wiring.

(3) In the liquid crystal display device described in (1), a first pixel is arranged between the first video signal line and the second video signal line, a second pixel is arranged between the first video signal line and the first video signal line, and a width of the first pixel in the first direction is larger than a width of the second pixel in the first direction.

(4) In the liquid crystal display device described in (1), a columnar spacer is formed in the counter substrate and comes into contact with the TFT substrate above the second video signal line.

(5) According to another aspect of the present invention, a liquid crystal display device includes: a TFT substrate including scanning lines extending in a first direction and being arranged in a second direction, video signal lines extending in the second direction and being arranged in the first direction, pixel electrodes arranged in regions surrounded by the scanning lines and the video signal lines, and common electrodes formed with a second insulating film arranged between the common electrodes and the pixel electrodes; a counter substrate opposed to the TFT substrate and including a columnar spacer; and a liquid crystal sandwiched between the TFT substrate and the counter substrate. A first common electrode extends between a first scanning line and a second scanning line in the first direction, a second common electrode extends between the second scanning line and a third scanning line in the first direction, and the first common electrode and the second common electrode are electrically connected by a bridge. The bridge covers a first video signal line without covering a second video signal line, when seen in a plan view. The common electrodes are formed above a first insulating film, and a first electrode is formed below the first insulating film. The first insulating film has a first through hole in a portion corresponding to the first electrode, and a connection ITO formed simultaneously with the common electrodes covers the first through hole and is insulated from the common electrodes. The second insulating film has a second through hole formed to correspond to the connection ITO. A pixel electrode is electrically connected to the first electrode. The connection ITO has a width in the first direction, and a center of the connection ITO in the first direction is located on a side of a center of a gap between the first video signal line and the second video signal line, the side being closer to the second video signal line.

(6) In the liquid crystal display device described in (5), the bridge is formed by a metal wiring.

(7) In the liquid crystal display device described in (5), a first pixel is arranged between the first video signal line and the second video signal line, a second pixel is arranged between the first video signal line and the first video signal line, and a width of the first pixel in the first direction is larger than a width of the second pixel in the first direction.

DETAILED DESCRIPTION OF THE PREFERRED EMBODIMENTS

The present invention is described in detail below, referring to embodiments.

First Embodiment

Figure 1:
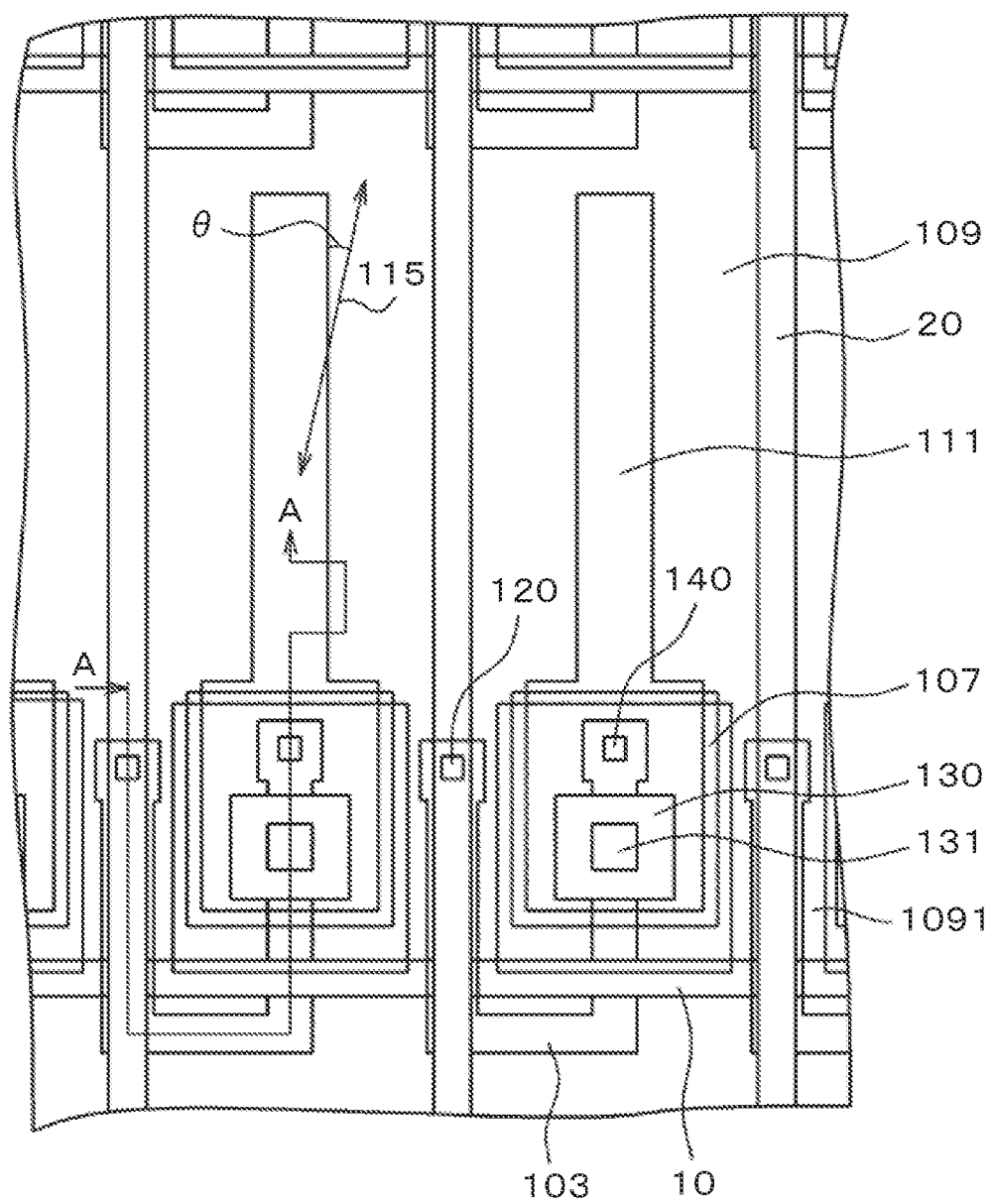
FIG. 1 is a plan view of a liquid crystal display device to which the present invention is applied.

FIG. 1 is a plan view of a liquid crystal display device employing IPS technology used in the present invention, illustrating a pixel structure. There are various types of the IPS technology. In one type, a common electrode is formed in a plane, a comb-teeth pixel electrode is arranged on the common electrode with an insulating film arranged therebetween, and liquid crystal molecules are rotated by an electric field generated between the pixel electrode and the common electrode. This type can achieve a relatively large transmittance and is therefore currently the main stream.

In FIG. 1, scanning lines 10 extend in a transverse direction and are arranged in a longitudinal direction with a predetermined pitch. The longitudinal pitch of the scanning lines 10 corresponds to the longitudinal size of a pixel. Video signal lines 20 extend in the longitudinal direction and are arranged in the transverse direction with a predetermined pitch. The transverse pitch of the video signal lines 20 corresponds to the transverse size of the pixel.

In the pixel, a stripe pixel electrode 111 extends in the longitudinal direction. In FIG. 1, the pixel electrode has a form of a single stripe because the pixel pitch is as small as 30 μm or less. However, when the pixel pitch is large, a comb-teeth electrode having a slit is formed as the pixel electrode.

A video signal is supplied to the pixel electrode 111 from a corresponding video signal line 20 via a through hole and a TFT. In FIG. 1, the video signal line and a semiconductor layer 103 are connected via the through hole 120. The semiconductor layer 103 extends below the video signal line 20, passes below the scanning line 10, is then bent, passes below the scanning line 10 again, and is connected to a contact electrode 107 via a through hole 140. The contact electrode 107 is connected to the pixel electrode via through holes 130 and 131. In a portion where the semiconductor layer 103 passes below the scanning line 10, the TFT is formed. In this case, the scanning line 10 also serves as a gate electrode. Therefore, in FIG. 1, two TFTs are formed from the video signal line 20 to the pixel electrode 11, that is, a so-called double-gate method is applied.

In FIG. 1, a direction of an alignment axis 115 formed in an alignment film is at an angle of θ with respect to the extending direction of the pixel electrode 111. The reason why the angle θ is formed is to define a direction of rotation of liquid crystal molecules when an electric field is applied to the pixel electrode 111. θ is from about 5° to about 15°, preferably from 7° to 10°. Note that in some cases the direction of the alignment axis 115 is along the longitudinal direction in FIG. 1 and the extending direction of the pixel electrode 111 is inclined by θ. FIG. 1 shows a case where dielectric anisotropy of the liquid crystal molecules is positive. The angle of the alignment axis in the case where the dielectric anisotropy of the liquid crystal molecules is negative is an angle rotated from that in FIG. 1 by 90°.

In FIG. 1, a common electrode is formed on an entire surface except for the through hole and its nearby portion. The common electrode 109 on the upper side of the scanning line and that on the lower side of the scanning line in FIG. 1 are connected via a common-electrode bridge 1091. The existence of the common-electrode bridge 1091 is a problem in order to increase the resolution and reduce the pixel pitch.

Figure 2:
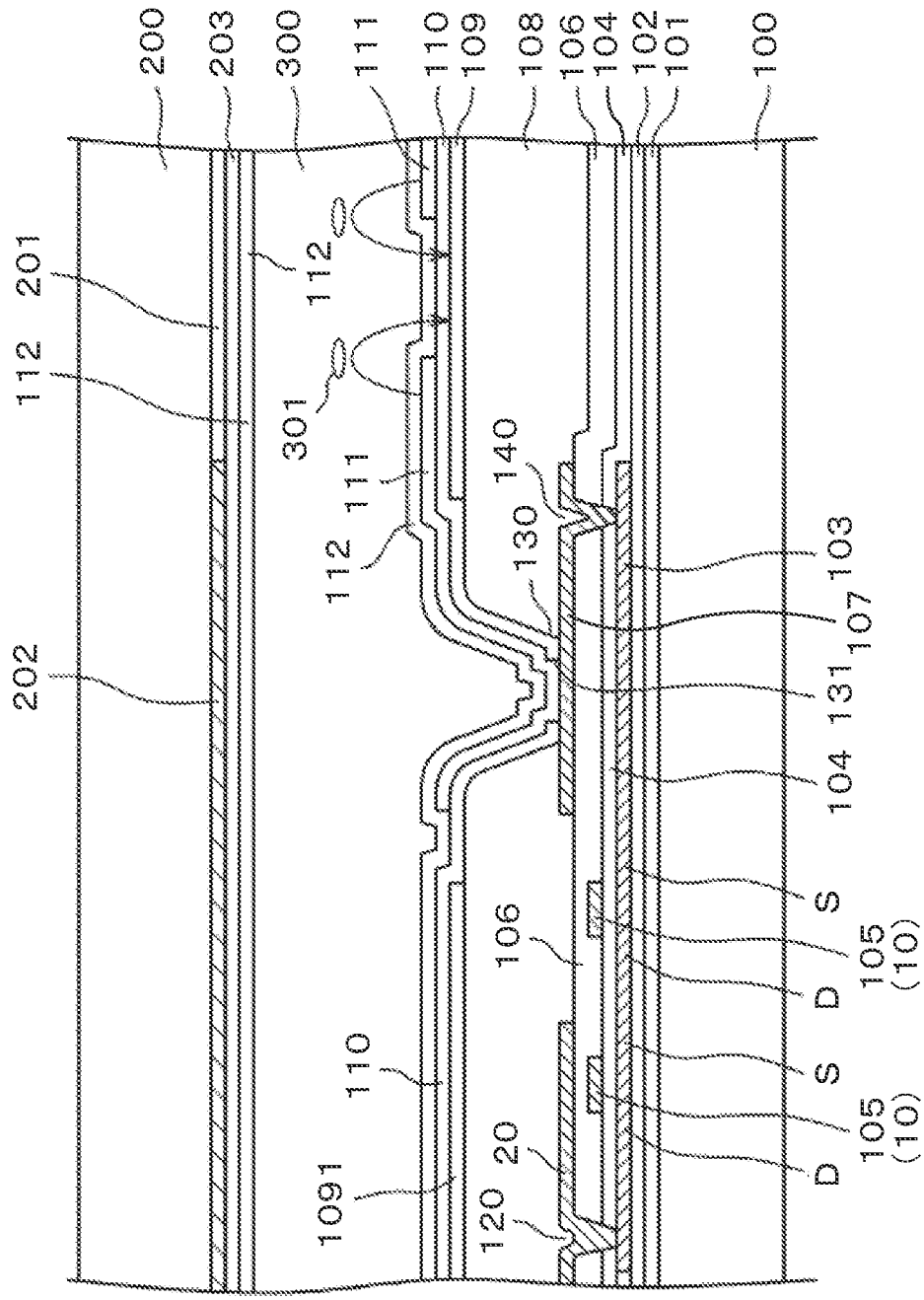
FIG. 2 is a cross-sectional view, taken along line A-A in FIG. 1.

FIG. 2 is a cross-sectional view, taken along line A-A in FIG. 1. The TFT in FIG. 2 is a so-called top gate TFT using LTPS (Low Temperature Poli-Si) as a semiconductor material. Meanwhile, in the case of using a-Si as the semiconductor material, a so-called bottom gate TFT is frequently used. The following description is made referring to the case of using the top gate TFT as an example, but the present invention can be also applied to the case of using the bottom gate TFT.

In FIG. 2, a first underlying film 101 of SiN and a second underlying film 102 of $SiO_2$ are formed on a glass substrate 100 by CVD (Chemical Vapor Deposition). The first underlying film 101 and the second underlying film 102 have a role of preventing impurities from the glass substrate 100 from contaminating the semiconductor layer 103.

The semiconductor layer 103 is formed on the second underlying film 102. This semiconductor layer 103 is obtained by depositing an a-Si film on the second underlying film 102 by CVD and then converting it to a poly-Si film by laser annealing. This poly-Si film is patterned by photolithography.

A gate insulating film 104 is formed on the semiconductor layer 103. This gate insulating film 104 is an $SiO_2$ film deposited by using TEOS (Tetraethoxysilane). This film is also deposited by CVD. A gate electrode 105 is formed on the gate insulating film 104. The gate electrode 105 is formed by the scanning line 10. The gate electrode 105 is formed by a MoW film, for example. When the resistance of the gate electrode 105 or the scanning line 10 has to be reduced, Al alloy is used.

Then, an interlayer insulating film 106 is formed of $SiO_2$ or SiN to cover the gate electrode 105. The interlayer insulating film 106 is formed for insulating the gate electrode 105 and the contact electrode 107 from each other. The semiconductor layer 103 is connected to the video signal line 20 via the through hole 120 formed in the gate insulating film 104 and the interlayer insulating film 106. Also, a through hole 140 is formed in the interlayer insulating film 106 and the gate insulating film 104 for connecting a source portion S of the TFT to the contact electrode 107. The through hole 120 and the through hole 140 in the interlayer insulating film 106 and the gate insulating film 104 are formed simultaneously.

The contact electrode 107 is formed on the interlayer insulating film 106. The semiconductor layer 103 extends below the video signal line 20 and passes below the scanning line 10, that is, the gate electrode 105 twice, as illustrated in FIGS. 1 and 2. In the portion where the semiconductor layer 103 passes below the scanning line 10, the TFTs are formed. In other words, the source portion S and a drain portion D of the TFT are formed to sandwich the gate electrode 105 therebetween, when seen in a plan view. The contact electrode 107 is connected to the semiconductor layer 103 via the through hole 140 formed in the interlayer insulating film 106 and the gate insulating film 104.

The contact electrode 107 and the video signal line 20 are formed simultaneously in the same layer. For the contact electrode 107 and the video signal line 20, AlSi alloy is used, for example, for achieving a small resistance. In this case, a structure sandwiching AlSi alloy between a barrier layer of MoW, for example, and a cap layer is employed, because AlSi alloy may cause hillocks or diffusion of Al to another layer.

An organic passivation film 108 is formed to cover the contact electrode 107, the video signal line 20, and the interlayer insulating film 106. The organic passivation film 108 is formed of photosensitive acrylic resin. Other than the acrylic resin, silicone resin, epoxy resin, and polyimide resin can be used for the organic passivation film 108, for example. The organic passivation film 108 serves as a flattening film and is therefore formed to be thick. The thickness of the organic passivation film 108 is from 1 μm to 4 μm. In most cases, the thickness of the organic passivation film 108 is from about 2 μm to about 3 μm.

The through hole 130 and the through hole 131 are respectively formed in the organic passivation film 108 and a capacity insulating film 110 described later for achieving electric continuity between the pixel electrode 111 and the contact electrode 107. Photosensitive resin is used for the organic passivation film 108. The photosensitive resin is applied and is then exposed with light. After the light exposure, only a portion exposed with light is dissolved by a specific developing agent. That is, the use of the photosensitive resin can eliminate formation of photoresist. After the through hole 130 is formed in the organic passivation film 108, firing is performed at about 230° C., so that the organic passivation film 108 is completed.

Subsequently, a transparent conductive film forming the common electrode 109, e.g., an ITO (Indium Tin Oxide) film, is formed by sputtering, and is patterned so that the ITO film is removed from the through hole 130 and a portion around the through hole 130. The common electrode 109 can be formed in a plane to be common to the pixels. However, the common electrode 109 has to be formed in a portion other than the through hole 130. Therefore, in the case of reducing the pixel pitch, the common-electrode bridge 1091 in FIG. 1 is a problem.

Figure 9:
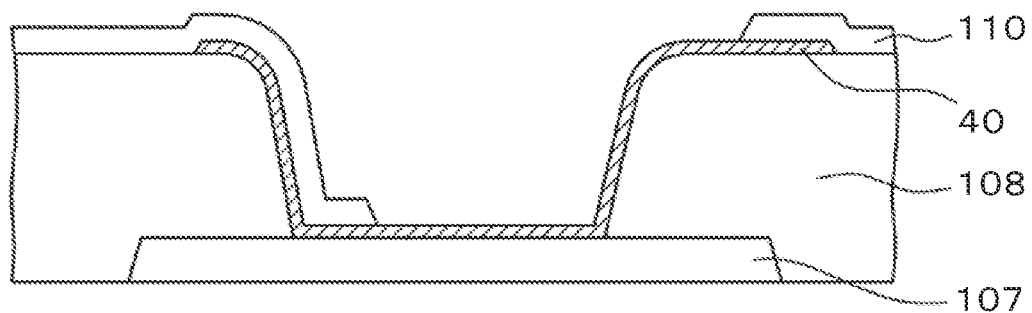
FIG. 9 is a cross-sectional view, taken along line C-C in FIG. 8.

In a second embodiment of the present invention, a connection ITO 40 is formed to cover the through hole 130 simultaneously with the common electrode 109, as illustrated in FIG. 9. The reason for this is to ensure a margin for achieving contact between the contact electrode 107 and the pixel electrode. In this case, it is necessary to insulate the connection ITO 40 and the common electrode 109 from each other.

Returning to FIG. 2, SiN forming the capacity insulating film 110 is deposited by CVD on the entire surface. Then, the through hole 131 is formed in the capacity insulating film 110 for achieving electric continuity between the contact electrode 107 and the pixel electrode 111 in the through hole 130.

Then, an ITO film is formed by sputtering and is patterned to form the pixel electrode 111. An example of the planar shape of the pixel electrode 111 is shown in FIG. 1. An alignment film material is applied onto the pixel electrode 111 by flexography or ink jet printing, for example, and is fired, so that the alignment film 112 is formed. As an alignment process of the alignment film 112, rubbing or optical alignment using polarized ultraviolet rays is used.

When a voltage is applied across the pixel electrode 111 and the common electrode 109, lines of electric force are generated as illustrated in FIG. 2. This electric field rotates liquid crystal molecules 301, and controls the amount of light passing through a liquid crystal layer 300 on a pixel-by-pixel basis. In this manner, an image is formed.

In FIG. 2, a counter substrate 200 is arranged with the liquid crystal layer 300 sandwiched between the counter substrate 200 and the TFT substrate. Inside the counter substrate 200 is formed a color filter 201. As the color filter 201, any one of red, green, and blue color filters is formed for every pixel, so that a color image is formed. A black matrix 202 is formed between the color filter 201 and the adjacent color filter 201 to improve a contrast of the image. The black matrix 202 also serves as a light shielding film of the TFT that prevents a photocurrent from flowing in the TFT.

An overcoat film 203 is formed to cover the color filter 201 and the black matrix 202. Because the surface of the color filter 201 and the black matrix 202 is uneven, the overcoat film 203 smoothens the surface. An alignment film 112 is formed on the overcoat film 203 to define an initial alignment of the liquid crystal molecules. As the alignment process of the alignment film 112, rubbing or optical alignment is used as in the alignment film 112 on the TFT substrate 100 side.

The above-described structure is merely an example. For example, an inorganic passivation film of SiN or the like is formed between the contact electrodes 107 and the video signal lines 20 in the TFT substrate 100 in some products.

Figure 3:
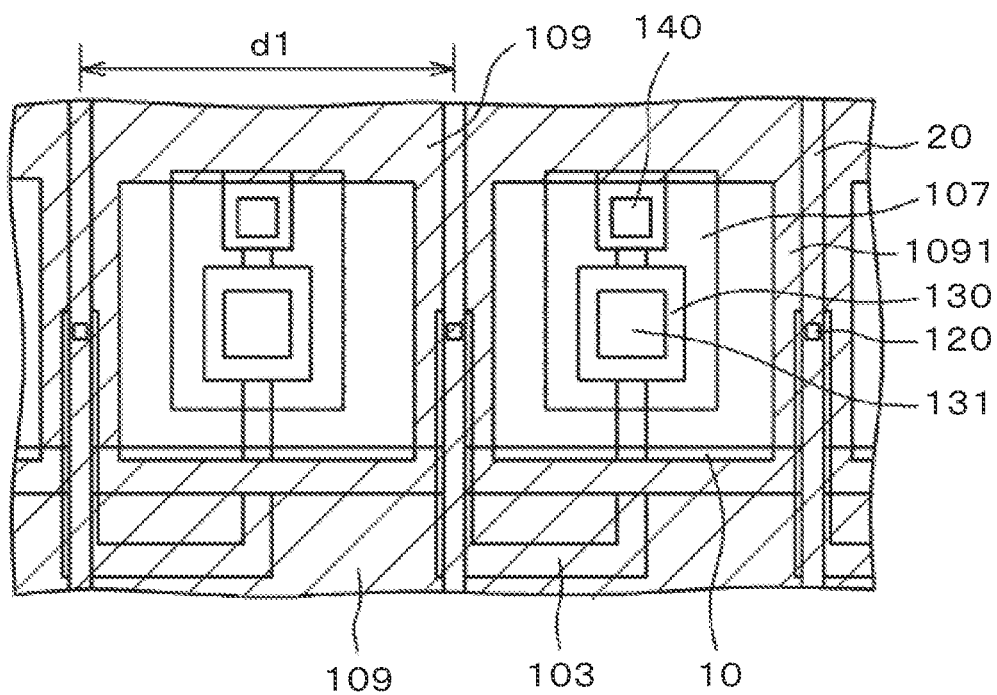
FIG. 3 is a plan view of a through hole and a nearby portion thereof in FIG. 1.

FIG. 3 is an enlarged plan view of the through hole 130 and its nearby portion in FIG. 1. The pixel electrode is omitted in FIG. 3. In FIG. 3, a region where the common electrode 109 is not formed is provided around the through hole 130 to have a rectangular hole shape. Thus, the common electrode 109 on the upper side of the through hole 130 and that on the lower side are connected by the common-electrode bridge 1091. When the pixel pitch is reduced, the existence of the common-electrode bridge 1091 becomes a problem. More specifically, because ITO forming the common electrode 109 has a large resistivity, the width of the common-electrode bridge 1091 has to be larger than those of the video signal line 20 and the semiconductor layer 103. Therefore, the existence of the common-electrode bridge 1091 is a problem, in particular, in the case of reducing the horizontal pixel pitch.

Figure 4:
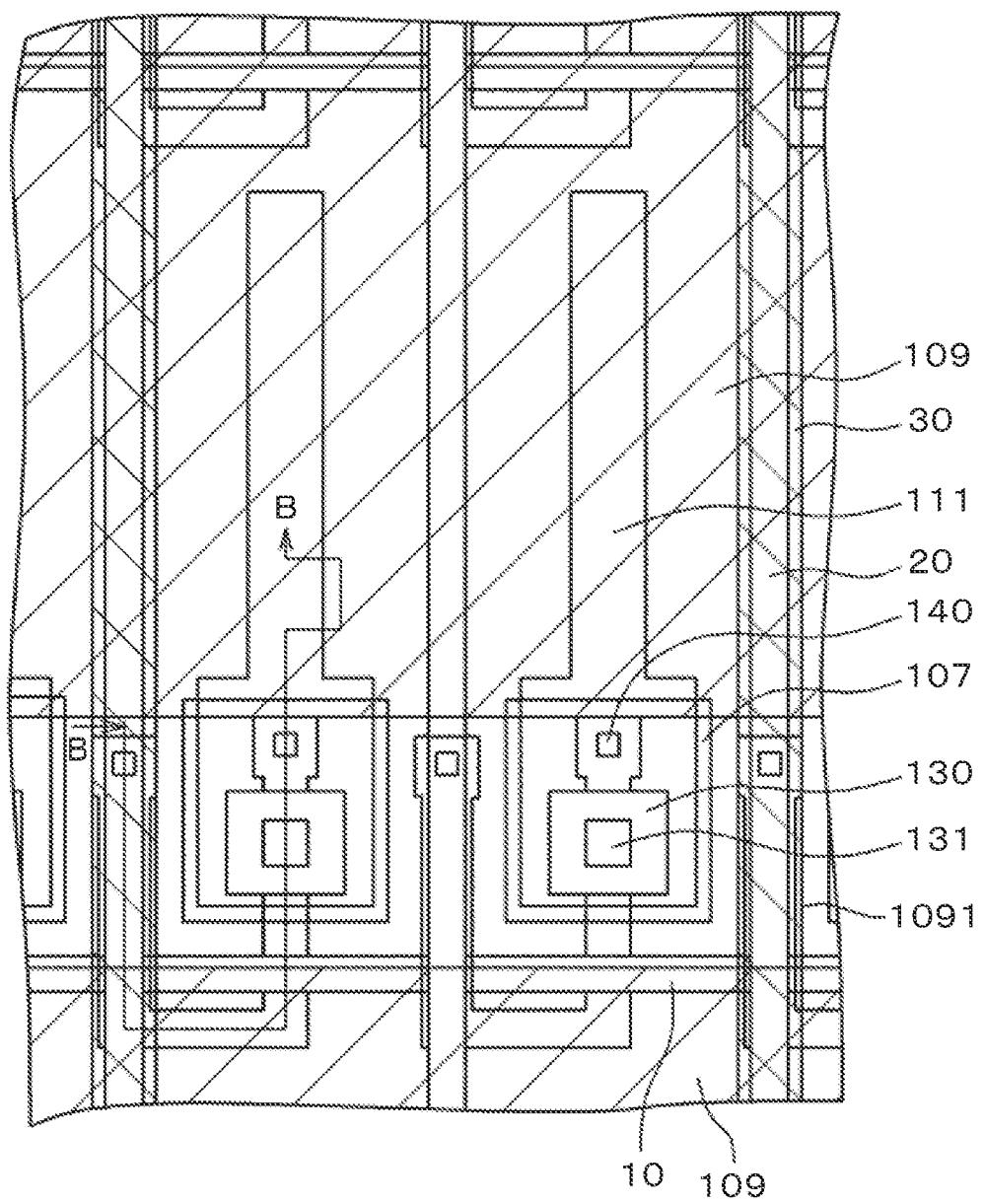
FIG. 4 is a plan view of a liquid crystal display device according to a first embodiment.

FIG. 4 is a plan view of the pixel in the case where the present embodiment is applied. FIG. 4 is different from FIG. 1 in a method of connecting the upper common electrode 109 and the lower common electrode 109 in FIG. 4. In FIG. 4, the common electrodes 109 extend in the transverse direction in stripes on the upper and lower sides of the through hole 130. A common metal wiring 30 extends above the common electrode 109 in the longitudinal direction to cover the video signal line 20. The common metal wiring 30 is used for reducing the resistance of the common electrode 109.

In FIG. 4, the upper common electrode 109 and the lower common electrode 109 are electrically connected by the common metal wiring 30. That is, the common metal wiring 30 serves as the bridge 1091 between the upper common electrode 109 and the lower common electrode 109. The common metal wiring 30 is formed of a metal, for example, MoCr alloy, MoW alloy, or Al alloy, and therefore has a smaller resistance than ITO. Thus, the width of the wiring can be made smaller. In other words, the upper common electrode 109 and the lower common electrode 109 can be connected by the common metal wiring 30 having the smaller width. A larger feature in FIG. 4 is that the common metal wiring 30 as the bridge 1091 is arranged for every other video signal line 20. This arrangement can further reduce the horizontal pixel pitch. The other structure in FIG. 4 is the same as that in FIG. 1 and therefore the description thereof is omitted.

Figure 5:
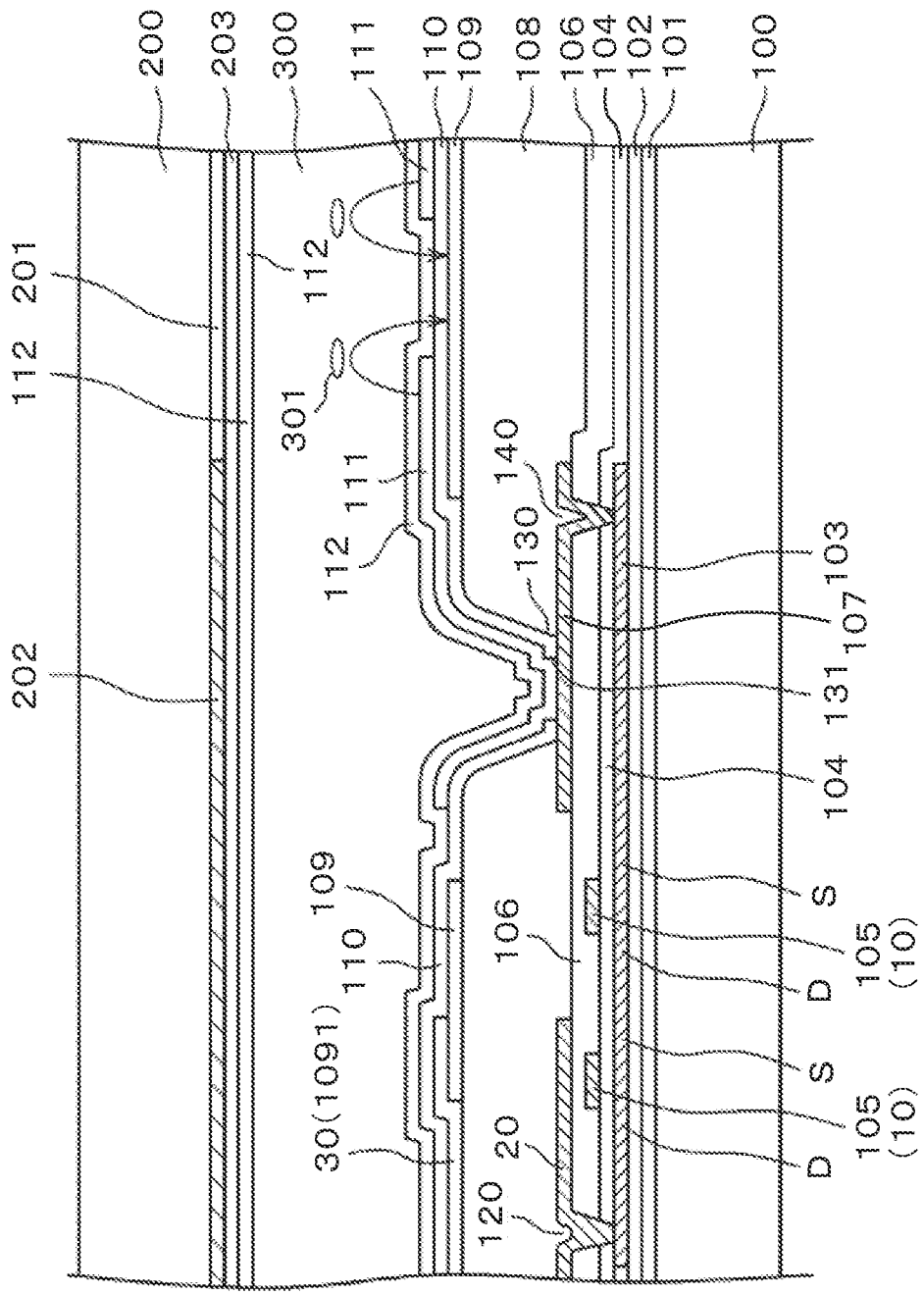
FIG. 5 is a cross-sectional view, taken along line B-B in FIG. 4.

FIG. 5 is a cross-sectional view, taken along line B-B in FIG. 4, and illustrates a cross-section of a portion where the common metal wiring 30 serves as the bridge 1091 between the common electrodes 109 in FIG. 4. FIG. 5 is different from FIG. 2 in that the common metal wiring 30 extends on the organic passivation film 108 on the left side in a region covering the video signal line 20, and is connected to the common electrode 109. Other portions in FIG. 5 are the same as those in FIG. 2 and therefore the description thereof is omitted.

Figure 6:
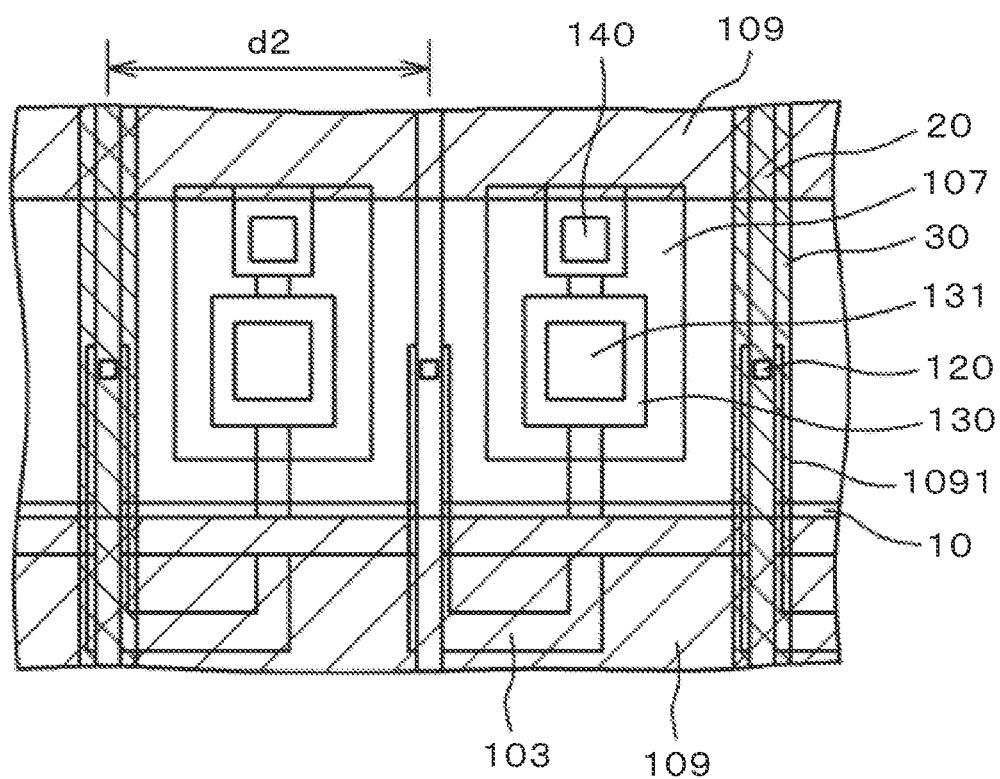
FIG. 6 is a plan view illustrating a feature of the first embodiment.

FIG. 6 is an enlarged plan view of the through hole 130 and its nearby portion in FIG. 4. The pixel electrode is omitted in FIG. 6. In FIG. 6, the common electrode 109 on the upper side of the through hole 130 and that on the lower side of the through hole 130 are connected by the common metal wiring 30. The common metal wiring 30 is formed to cover every other video signal line 20. Consequently, the pixel pitch d2 in FIG. 6 is smaller than the pixel pitch d1 in FIG. 3. That is, the structure in FIG. 6 can be applied to a higher-resolution screen.

Figure 7:
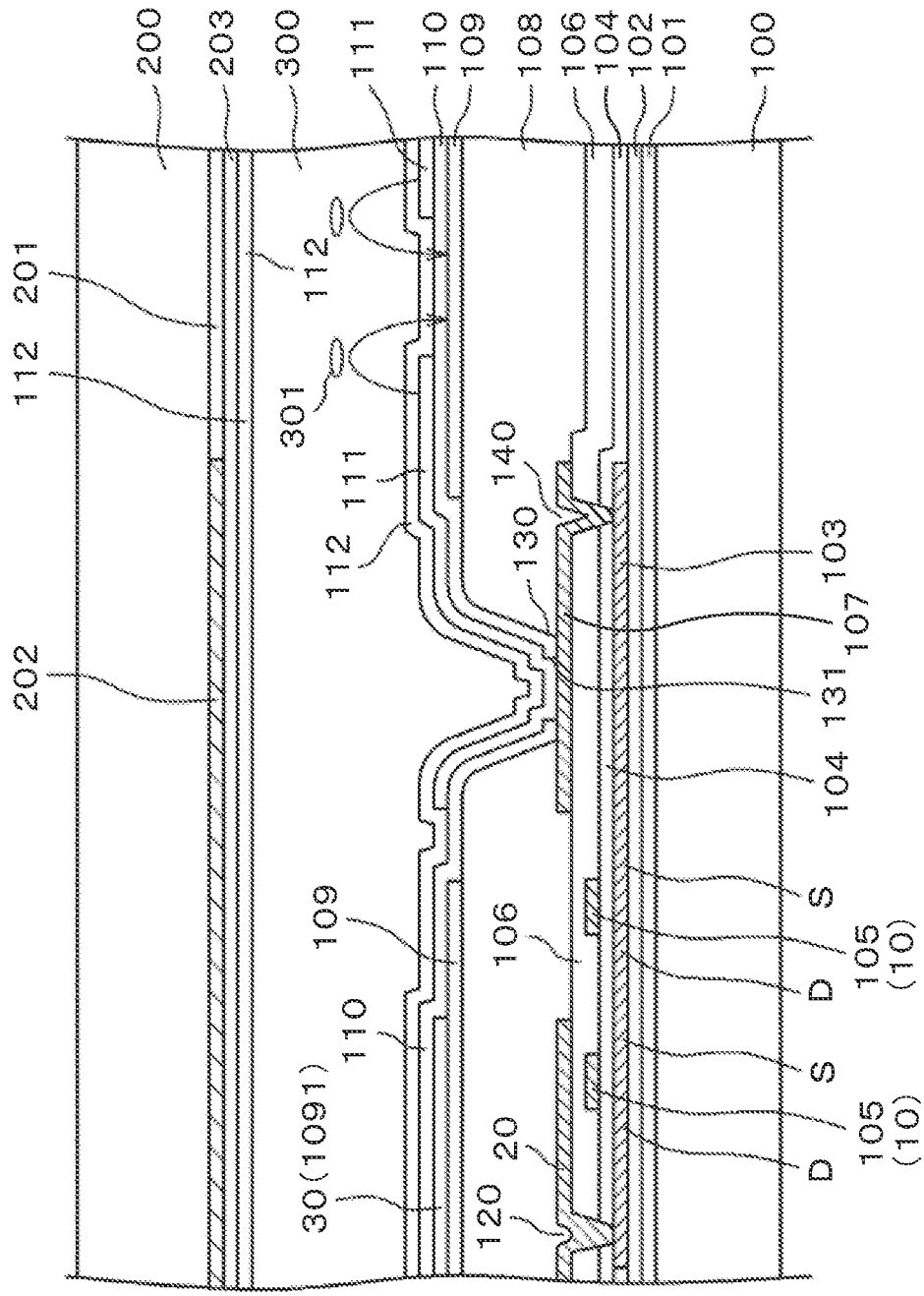
FIG. 7 is a cross-sectional view illustrating another form of the first embodiment.

FIG. 7 is a cross-sectional view illustrating another form of the present invention, corresponding to the cross-section taken along line B-B in FIG. 4. FIG. 7 is different from FIG. 5 in that the bridge 1091 connecting the common electrodes 109 in the region covering the video signal line 20 has a multilayer structure of the ITO film 109 forming the common electrode and the common metal wiring 30. Due to the multilayer structure, the resistance of the bridge 1091 can be slightly reduced, as compared with the resistance in the case of FIG. 5. Further, due to the multilayer structure, tolerance for disconnection of the bridge 1091 can be increased. Note that patterning of the common electrode 109 is performed by photolithography and is not burden in the process.

In the present embodiment described above, the bridge 1091 connecting the common electrodes 109 is formed by the common metal wiring 30, and the common metal wiring 30 is formed to correspond to every other video signal line 20. However, in a product in which the resistance of the common electrode 109 is not a big problem, the bridge 1091 can be formed by ITO forming the common electrode 109 to correspond to every other video signal line 20 without using the common metal wiring 30. Also in this case, reduction of the pixel pitch can be achieved by the existence of the region including no bridge 1091.

Second Embodiment

Figure 8:
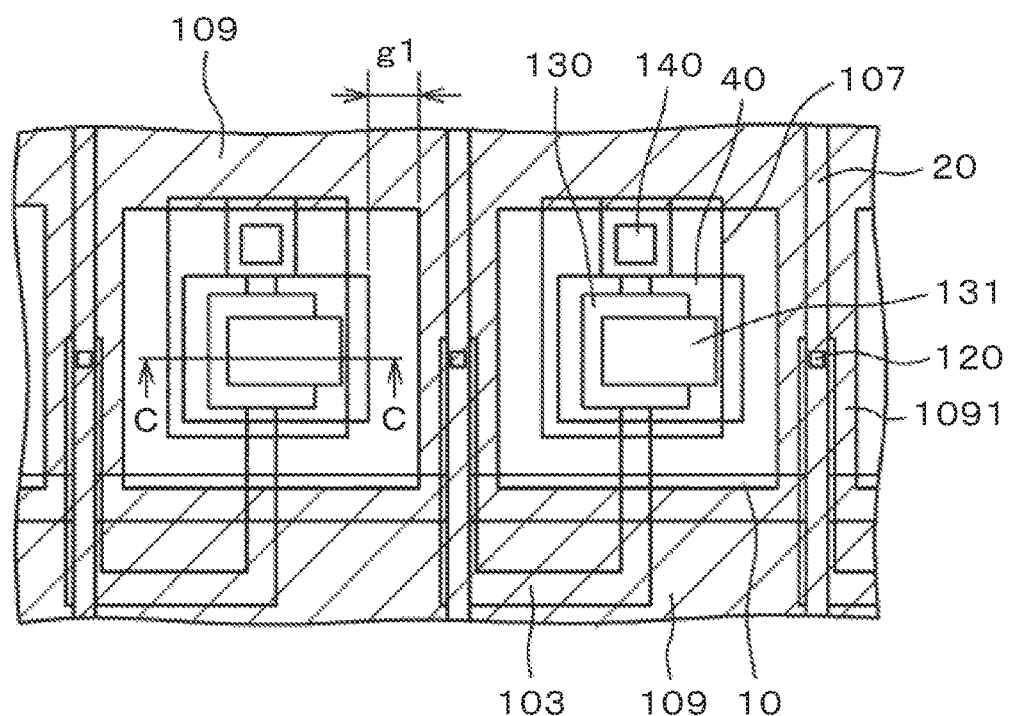
FIG. 8 is a plan view illustrating a feature of a second embodiment.

FIG. 8 is a plan view of the pixel to which the present invention is applied, illustrating the through hole 130 and its nearby portion. The pixel electrode is omitted in FIG. 8. The plan view of the entire pixel in the present embodiment is the same as FIG. 1, and the cross-sectional view is the same as FIG. 2. FIG. 8 is different from FIG. 3 in a connection ITO 40 formed in the portion of the through hole 130, and the diameter and location of the through hole 131 formed in the capacity insulating film 110.

In order to form the through hole 131 in the capacity insulating film 110 only at the bottom of the through hole 130 formed in the organic passivation film 108, it is necessary to make the diameter of the through hole 130 large, which is disadvantageous for reducing the pixel pitch. In the present embodiment, the connection ITO 40 formed simultaneously with the common electrode 109 is used, thereby offering freedom of designing the location and shape of the through hole 131 formed in the capacity insulating film 110. Due to this, the diameter of the through hole 130 formed in the organic passivation film 108 can be reduced.

In FIG. 8, the connection ITO 40 is formed to cover the through hole 130. The connection ITO 40 is formed simultaneously with the common electrode 109. Therefore, there is no process burden. However, the connection ITO 40 has to be insulated from the common electrode 109, because the connection ITO 40 is connected to the pixel electrode. The capacity insulating film 110 of SiN is formed to cover the connection ITO 40 and the common electrode 109, and the through hole 131 is formed in the capacity insulating film 110. In FIG. 8, the through hole 131 is formed not only at the bottom of the through hole 130 but also on the side face of the through hole 130 and a part of an upper surface of a portion around the through hole 130. Therefore, even in the case where the through hole 130 is small, the through hole 131 can be easily formed.

FIG. 9 is a cross-sectional view, taken along line C-C in FIG. 8. In FIG. 9, the connection ITO 40 is formed to cover the through hole 130 in the organic passivation film 108. The capacity insulating film 110 is formed to cover the connection ITO 40, and the through hole 131 is formed in the capacity insulating film 110. In this through hole 131, the connection ITO 40 is exposed and is to be connected to the pixel electrode. As illustrated in FIG. 9, the through hole 131 in the capacity insulating film 110 can be formed to be large in the present embodiment, even in the case where the through hole 130 formed in the organic passivation film 108 is small. Therefore, reliability of connection can be improved.

However, the connection ITO 40 has to be insulated from the common electrode 109. Because the connection ITO 40 and the common electrode 109 are formed in the same layer, a gap g1 between the connection ITO 40 and the common electrode 109 has to be sufficiently large when the bridge 1091 connecting the upper common electrode 109 and the lower common electrode 109, illustrated in FIG. 8, is formed by the same ITO film as that for the common electrode 109. Thus, there is a limit on reduction of the pixel pitch.

Figure 10:
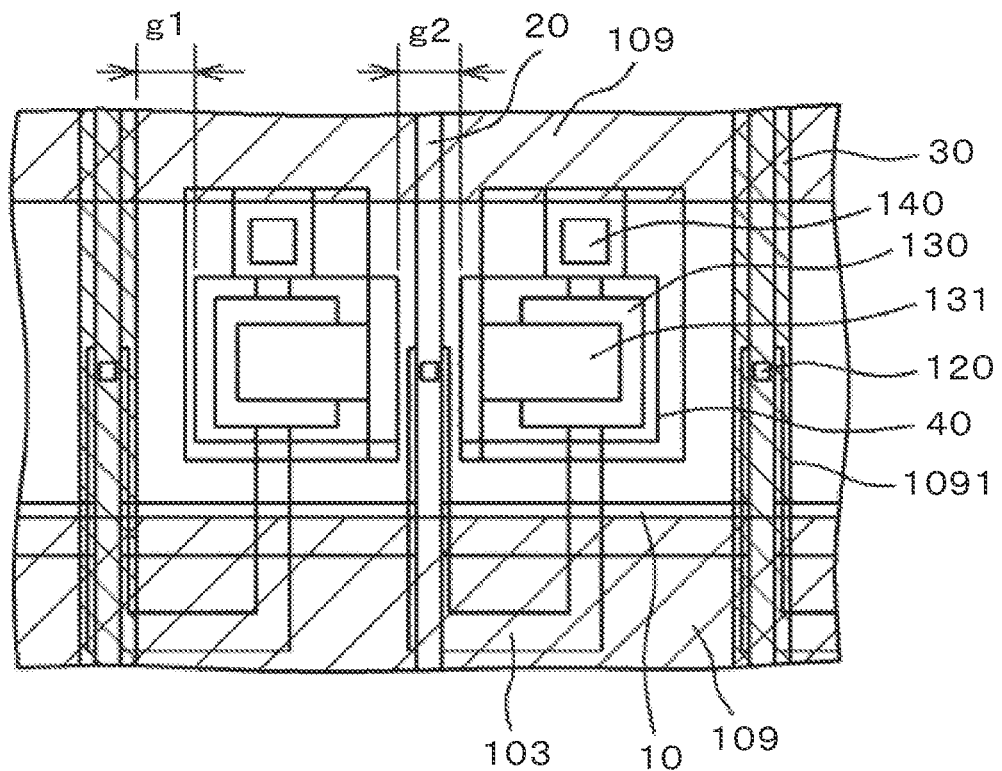
FIG. 10 is another plan view illustrating the feature of the second embodiment.

In the present embodiment, connection between the upper common electrode 109 and the lower common electrode 109 is achieved by the common metal wiring 30, as illustrated in FIG. 10. The common metal wiring 30 is arranged to correspond to every other video signal line. On a side where no common metal wiring 30 is provided, insulation between the connection ITO 40 and the common electrode 109 or the common metal wiring 30 is not a problem. Therefore, in FIG. 10, it is only necessary to pay attention to a gap g2 on this side.

Meanwhile, on a side where the common metal wiring 30 is provided in FIG. 10, the gap g1 between the connection ITO 40 and the common metal wiring 30 has to be ensured. Therefore, a horizontal center position of the connection ITO 40 is shifted to the side where no common metal wiring 30 is provided from the center position of the pixel. Due to this shifting, the transverse diameter of the pixel can be reduced and therefore the pixel pitch can be reduced.

In other words, in the present embodiment, the diameter of the through hole 130 formed in the organic passivation film 108 can be reduced. Also, the pixel pitch can be further reduced by shifting the center of the connection ITO 40 from the center of the pixel, that is, the center between the video signal lines 20.

As in the first embodiment, the bridge 1091 connecting the upper common electrode 109 and the lower common electrode 109 can have a multilayer structure of ITO forming the common electrode 109 and the common metal wiring 30 or a structure including only ITO forming the common electrode 109.

Third Embodiment

Figure 11:
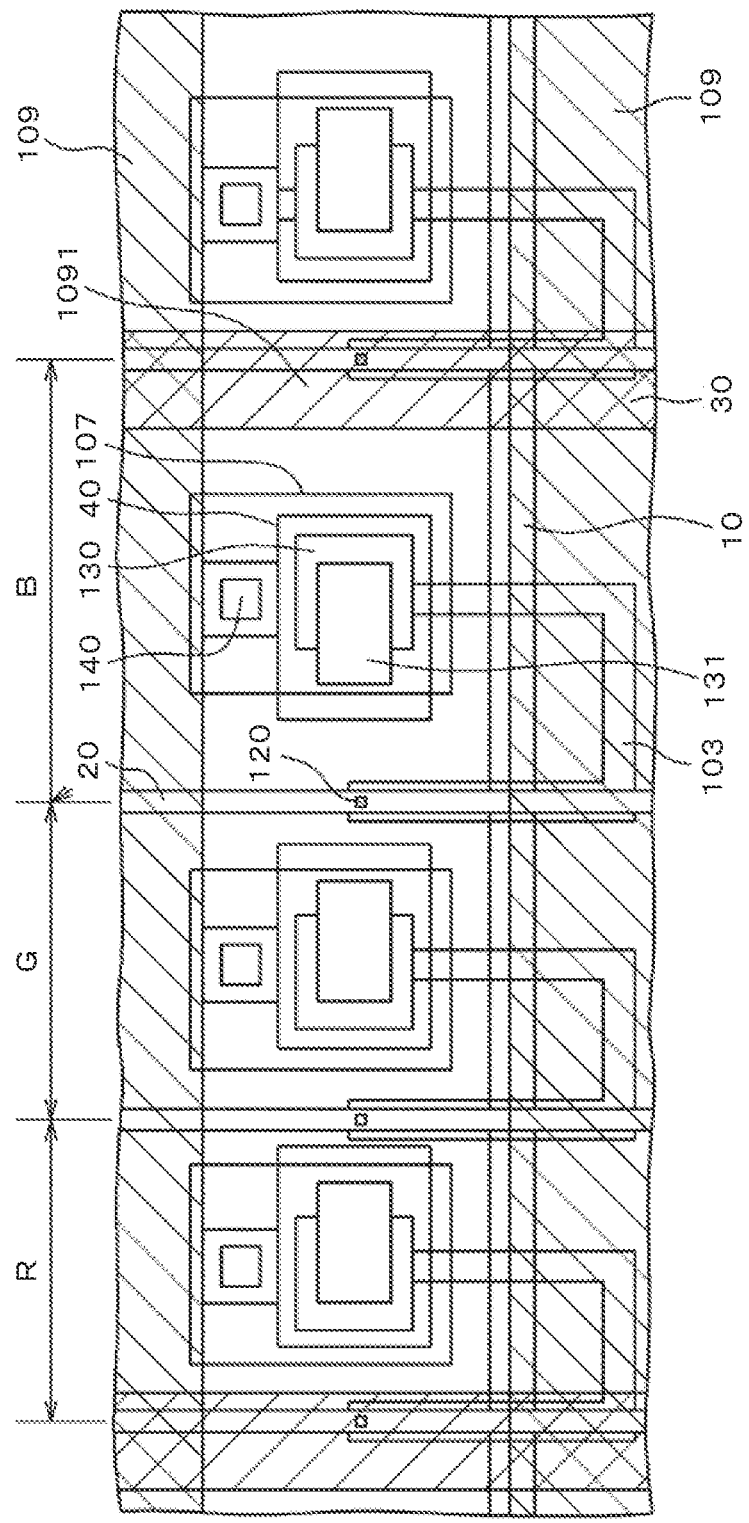
FIG. 11 is a plan view illustrating a feature of a third embodiment.

FIG. 11 is a plan view of the pixel according to a third embodiment, illustrating the through hole 130 and its nearby portion. The basic structure and the cross-section of the pixel are similar to those illustrated in FIGS. 1 and 2. A feature in FIG. 11 is that one of a red pixel, a green pixel, and a blue pixel has a larger horizontal diameter than those of others. The reason is to handle different requests for a white tone from customers, for example. In FIG. 11, the diameter of the blue pixel is larger than those of other pixels. That is, B>R=G in FIG. 11. However, the red pixel or the green pixel is larger in some cases.

In FIG. 11, the common electrodes 109 extend in stripes in the horizontal direction on upper and lower sides of the through hole 130. While the upper common electrode 109 and the lower common electrode 109 are connected by the common metal wiring 30 as the bridge 1091, the common metal wiring 30 for the bridge 1091 is mainly provided only in the blue pixel having the larger width. The structure of the through hole 130 in FIG. 11 is the same as that described referring to FIGS. 8 to 10. In the through holes 130 arranged on both sides of the common metal wiring 30 in FIG. 11, the horizontal center of the connection ITO 40 is arranged in a direction away from the common metal wiring 30. The reason for this is the same as that described in the second embodiment.

With the structure in FIG. 11, the common metal wiring 30 for the bridge 1091 is formed in a portion corresponding to the pixel having the larger pixel width, the bridge 1091 is not formed in other portions, and the connection ITO 40 is formed, so that the diameter of the through hole 130 can be reduced. Therefore, the pixel pitch can be reduced.

Also, in FIG. 11, the bridge 1091 formed in the portion corresponding to the wider pixel can have a multilayer structure of the common metal wiring 30 and ITO forming the common electrode 109 or a structure including only ITO forming the common electrode 109, other than the structure including only the common metal wiring 30, as in the first embodiment.

Although the bridge electrode is formed only in the portion corresponding to the pixel having the larger pixel width in FIG. 11, the present embodiment is not limited thereto. Even in the case where the red, green, and blue pixels have the same pixel width, the common metal wiring 30 for bridge connection can be provided for every three video signal lines 20. Also in this case, the center of the connection ITO 40 is formed to go away from the bridge 1091, thereby further enhancing the effect of reduction of the pixel pitch.

In the present embodiment described above, the structure is described in the case where the connection ITO 40 is formed in the portion of the through hole 130. However, according to the present embodiment, the pixel pitch can be reduced as a whole by forming the bridge 1091 mainly for the wider pixel, even in a structure including no connection ITO 40.

Fourth Embodiment

Figure 12:
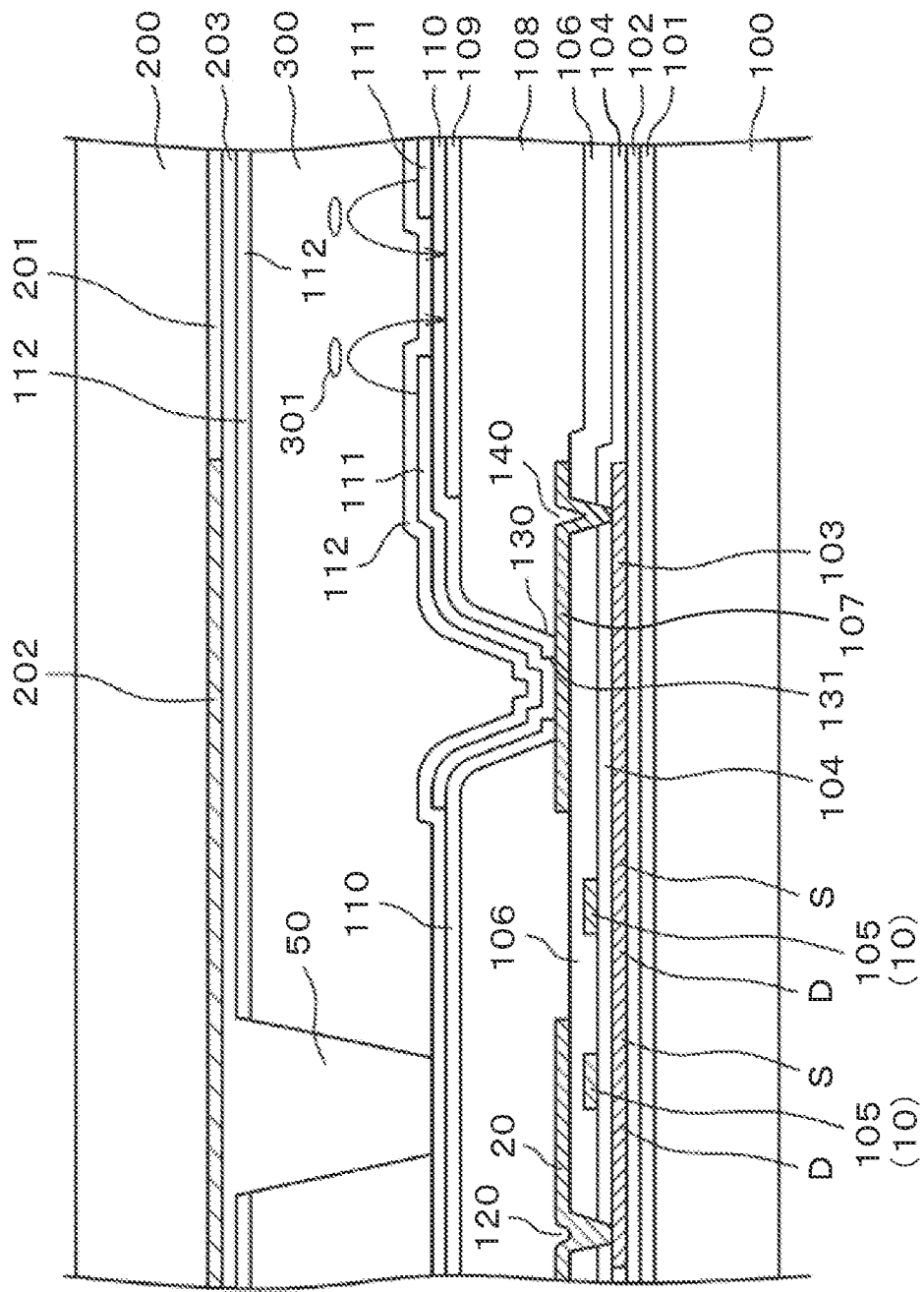
FIG. 12 is a cross-sectional view in a fourth embodiment.

It is necessary to define a gap between a TFT substrate and a counter substrate in a liquid crystal display device. The gap between the TFT substrate 100 and the counter substrate 200 is generally defined by a columnar spacer. FIG. 12 illustrates an example in which the gap between the TFT substrate 100 and the counter substrate 200 is defined by the columnar spacer 50 in the present embodiment. The columnar spacer 50 formed in the counter substrate 200 defines the gap between the TFT substrate 100 and the counter substrate 200. The columnar spacer 50 is formed in the counter substrate 200 simultaneously with the overcoat film 203.

Another difference between FIGS. 12 and 2 is that the common electrode 109 or the bridge 1091 does not exist in a portion of the TFT substrate 100 that is to come into contact with the columnar spacer 50. The other structure in FIG. 12 is the same as that in FIG. 2.

Figure 13:
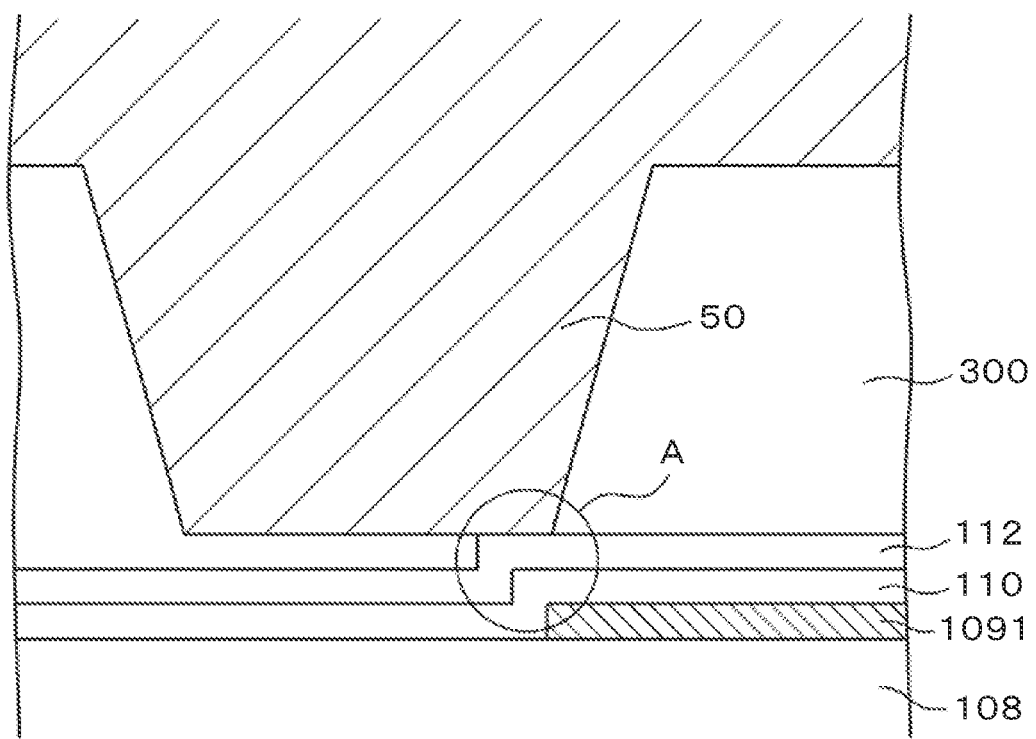
FIG. 13 is a schematic cross-sectional view illustrating an example of a cause of an occurrence of scraping of an alignment film.

A tip of the columnar spacer 50 comes into contact with the alignment film 112 formed in the TFT substrate 100. However, when the alignment film 112 is scraped by this contact, scraped chips cause bright spots. Such scraping can easily occur, especially in the case where a surface opposed to the columnar spacer 50, with which the tip of the columnar spacer 50 is to come into contact, is uneven as illustrated in FIG. 13. FIG. 13 illustrates a case where the tip of the columnar spacer 50 comes into contact with an end portion of the bridge 1091. In a region including a step of the bridge 1091, that is, a region A in FIG. 13, the alignment film 112 can be easily scraped. This bridge 1091 is the ITO film formed simultaneously with the common electrode 109 in some cases and is the common metal wiring 30 in other cases.

Figure 14:
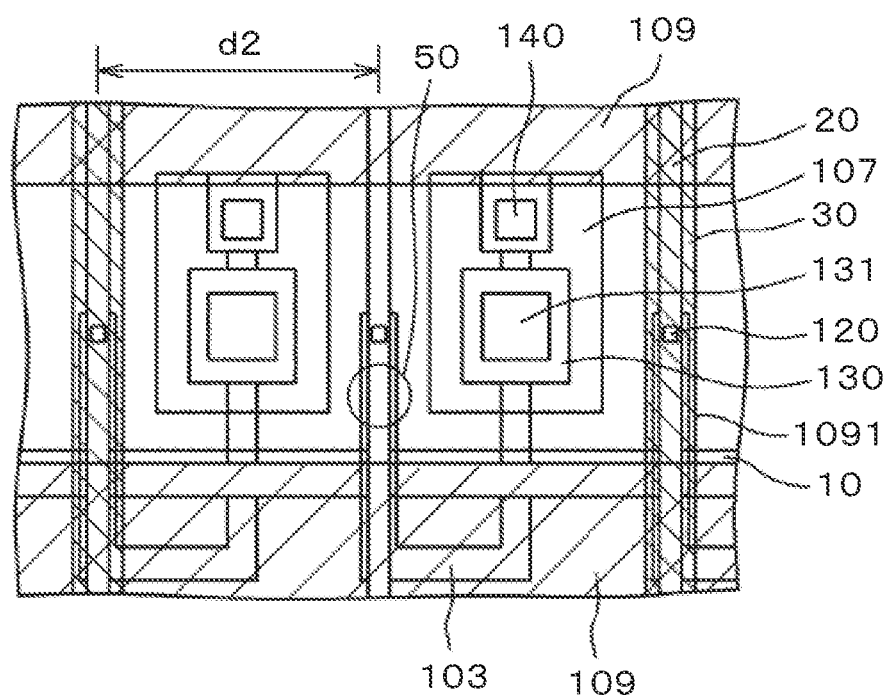
FIG. 14 is a plan view illustrating a feature of the fourth embodiment.

FIG. 14 is a plan view of the through hole 130 and its nearby portion, illustrating a feature of the present embodiment. In FIG. 14, the pixel electrode is omitted. In FIG. 14, the columnar spacer 50 comes into contact with the TFT substrate 100 in a portion where the common metal wiring 30 as the bridge 1091 connecting the upper common electrode 109 and the lower common electrode 109 or the ITO film formed simultaneously with the common electrode 109 does not exist. With this structure, the step illustrated in FIG. 13 can be eliminated at the tip of the columnar spacer 50 and it is therefore possible to prevent the alignment film 112 from being scraped. The other structure in FIG. 14 is the same as that in FIG. 6 and therefore the description thereof is omitted.

The structure of the present embodiment can be applied to the structure of the second embodiment illustrated in FIG. 10 and the structure of the third embodiment illustrated in FIG. 11, for example. In other words, the tip of the columnar spacer 50 can come into contact with a portion of the TFT substrate 100 above the video signal line 20, in which the ITO film formed simultaneously with the common electrode 109 or the common metal wiring 30 is not formed.

What is claimed is:

1. A display device comprising:
a scanning line extending in a first direction:
a video signal line;
a first pixel electrode adjacent to the video signal line in a first side of the first direction;
a second pixel electrode adjacent to the video signal line in a second side opposed to the first side of the first direction;
a first thin film transistor connected to the first pixel electrode;
a second thin film transistor connected to the second pixel electrode;
a first common electrode extended parallel to the scanning line;
a second common electrode extended parallel to the scanning line and located apart from the first common electrode in a second direction intersecting the first direction;
a plurality of common-electrode bridges connected between the first common electrode and the second common electrode,
wherein
the plurality of common-electrode bridges includes a first common-electrode bridge and a second common-electrode bridge,
the first common-electrode bridge extends parallel to the video signal line and located apart from the video signal line in the first side of the first direction,
the second common-electrode bridge extends parallel to the video signal line and located apart from the video signal line in the second side of the first direction,
the video signal line is located between the first common-electrode bridge and the second common-electrode bridge in the first direction,
a first contact region, where the first pixel electrode and the first thin film transistor are connected, is surrounded by the video signal line, the first common-electrode bridge, the first common electrode and the second common electrode,
a second contact region, where the second pixel electrode and the second thin film transistor are connected, is surrounded by the video signal line, the second common-electrode bridge, the first common electrode and the second common electrode, and
the video signal line overlaps none of the plurality of common-electrode bridges.

2. The display device according to claim 1, wherein the plurality of common-electrode bridges are formed by ITO film.

3. The display device according to claim 2, further comprising a plurality of common metal wirings,
the plurality of common metal wirings extend parallel to the video signal line and connect between the first common electrode and the second common electrode,
the plurality of common metal wirings include a first metal wiring and a second metal wiring,
the first metal wiring is connected to first common-electrode bridge and overlapping with the first common-electrode bridge,
the second metal wiring is connected to second common-electrode bridge and overlapping with the second common-electrode bridge, and
the video signal line overlaps none of the plurality of common metal wirings.

4. The display device according to claim 3, wherein the scanning line is gates of the first thin film transistor and the second thin film transistor.

5. The display device according to claim 3, wherein none of the plurality of common-electrode bridges are located between the first contact region and the second contact region in the first direction.

* * * * *